United States Patent
Qu et al.

(10) Patent No.: US 9,510,341 B2
(45) Date of Patent: *Nov. 29, 2016

(54) METHOD, BASE STATION, UE, AND SYSTEM FOR SENDING AND RECEIVING PDCCH SIGNALING

(71) Applicant: HUAWEI TECHNOLOGIES CO.,LTD., Shenzhen, Guangdong (CN)

(72) Inventors: Bingyu Qu, Beijing (CN); Lei Guan, Beijing (CN); Lixia Xue, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/851,449

(22) Filed: Sep. 11, 2015

(65) Prior Publication Data
US 2016/0007326 A1 Jan. 7, 2016

Related U.S. Application Data

(63) Continuation of application No. 14/517,531, filed on Oct. 17, 2014, now Pat. No. 9,137,794, which is a continuation of application No. 13/685,092, filed on Nov. 26, 2012, now Pat. No. 8,879,533, which is a
(Continued)

(30) Foreign Application Priority Data

Feb. 11, 2010 (CN) .......................... 2010 1 0111643
Mar. 29, 2010 (CN) .......................... 2010 1 0142160
Apr. 30, 2010 (CN) .......................... 2010 1 0165438

(51) Int. Cl.
*H04W 72/04* (2009.01)
*H04L 5/00* (2006.01)

(52) U.S. Cl.
CPC ............ *H04W 72/042* (2013.01); *H04L 5/001* (2013.01); *H04L 5/0053* (2013.01)

(58) Field of Classification Search
CPC ... H04W 72/042; H04L 5/001; H04L 5/0053
See application file for complete search history.

(56) References Cited

U.S. PATENT DOCUMENTS 8,340,069 B2 12/2012 Qu et al.
9,137,794 B2* 9/2015 Qu ............................ H04L 5/001
(Continued)

FOREIGN PATENT DOCUMENTS

CN 101505498 A 8/2009
CN 101547514 A 9/2009
(Continued)

OTHER PUBLICATIONS

3GPP TSG RAN WG1 Meeting #59 R1-094460,"Discussion on explicit carrier indicator field",Research in Motion UK Limited,Nov. 9-13, 2009,total 3 pages.
(Continued)

*Primary Examiner* — Melvin Marcelo
(74) *Attorney, Agent, or Firm* — Huawei Technologies Co., Ltd.

(57) ABSTRACT

A method, a base station, a User Equipment (UE) and a system for sending and receiving Physical Downlink Control Channel (PDCCH) signaling are disclosed. A method includes determining locations of a first search space and a second search space of a User Equipment (UE). A method also includes sending PDCCH signaling with no Carrier Indication Field (CIF) to the UE in a physically overlapped region between the first search space and the second search space if the physically overlapped region exists and a length of the PDCCH signaling with no CIF in the first search space is equal to a length of PDCCH signaling with the CIF in the second search space.

10 Claims, 5 Drawing Sheets

Related U.S. Application Data continuation of application No. 13/336,209, filed on Dec. 23, 2011, now Pat. No. 8,340,069, which is a continuation of application No. PCT/CN2011/070937, filed on Feb. 11, 2011.

(56) References Cited

U.S. PATENT DOCUMENTS

| | | |
|---|---|---|
| 2009/0257449 A1 | 10/2009 | Chen et al. |
| 2011/0070845 A1 | 3/2011 | Chen et al. |
| 2011/0228732 A1 | 9/2011 | Luo et al. |
| 2012/0009923 A1 | 1/2012 | Chen et al. |
| 2012/0327917 A1 | 12/2012 | Yang et al. |
| 2013/0094383 A1 | 4/2013 | Lin |

FOREIGN PATENT DOCUMENTS

| | | |
|---|---|---|
| CN | 101600206 A | 12/2009 |
| CN | 101646202 A | 2/2010 |
| JP | 2011519205 A | 6/2011 |
| WO | 2008157692 A2 | 12/2008 |
| WO | 2009041779 A1 | 4/2009 |
| WO | 2009124079 A1 | 10/2009 |
| WO | 2010013970 A2 | 2/2010 |

OTHER PUBLICATIONS

3GPP TSG RAN WG1 meeting #59b R1-100241,"Remaining issues on Cross-Carrier PDCCH Indication",Huawei, Jan. 18-22, 2010,total 4 pages.

3GPP TSG RAN WG1 Meeting #59 R1-095070,"Way Forward on Carrier Indicator Field",CATT et al.,Oct. 9-13, 2009,total 2 pages.

3GPP TSG RAN WG1 Meeting #59 R1-094830,"PDCCH Design for Cross-Carrier Operation Using CIF",Motorola, Nov. 9-13, 2009,total 3 pages.

3GPP TSG RAN WG1 Meeting #60 R1-101047,"Remaining Issues on Carrier Indicator Field",Huawei, Feb. 22-26, 2010,total 4 pages.

3GPP TSG RAN WG1 #60 R1-101139,"Configuration Aspects for Carrier Indicator Field",Samsung, Feb. 22-26, 2010,total 4 pages.

3GPP TSG RAN WG1 Meeting #69 R2-101537,"UE Assignment Methods During CIF Configuration",NTT DOCOMO, Inc.,Feb. 22-26, 2010,total 5 pages.

3GPP TSG RAN WG1 #59bis R1-100092,"Configuration Aspects for Carrier Indicator Field",Samsung, Jan. 19-23, 2010,total 3 pages.

3GPP TS 36.213 V9.0.1,3rd Generation Partnership Project;Technical Specification Group Radio Access Network; Evolved Universal Terrestrial Radio Access (E-UTRA);Physical layer procedures(Release 9),Dec. 2009,total 79 pages.

Luo, Tao., U.S. Appl. No. 61/315,367, filed Mar. 18, 2010.

Luo, Tao., U.S. Appl. No. 61/384,613, filed Sep. 20, 2010.

* cited by examiner

METHOD, BASE STATION, UE, AND SYSTEM FOR SENDING AND RECEIVING PDCCH SIGNALING

CROSS-REFERENCE TO RELATED APPLICATIONS

This application is a continuation of U.S. application Ser. No. 14/517,531, filed on Oct. 17, 2014, which is a continuation of U.S. application Ser. No. 13/685,092, filed on Nov. 26, 2012, now U.S. Pat. No. 8,879,533. The U.S. application Ser. No. 13/685,092 is a continuation of U.S. application Ser. No. 13/336,209, filed on Dec. 23, 2011, now U.S. Pat. No. 8,340,069. The U.S. application Ser. No. 13/336,209 is a continuation of International Application No. PCT/CN2011/070937, filed Feb. 11, 2011. The International Application claims priority to Chinese Patent Application No. 201010111643.5, filed on Feb. 11, 2010, Chinese Patent Application No. 201010142160.1, filed on Mar. 29, 2010, and Chinese Patent Application No. 201010165438.7, filed on Apr. 30, 2010. All of these applications are hereby incorporated by reference in their entireties.

TECHNICAL FIELD

The present invention relates to communications technologies, and in particular, to a method, a base station, a User Equipment (US), and a system for sending and receiving Physical Downlink Control Channel (PDCCH) signaling.

BACKGROUND

A Carrier Aggregation (CA) technology is introduced in a Long Term Evolution-Advanced (LTE-A) system. That is, multiple Component Carriers (CC) are scheduled for one UE to fulfill a higher peak rate and service requirements.

In a system not based on the CA technology, resources of only one carrier can be scheduled by a piece of Physical Downlink Control Channel (PDCCH) signaling. In a system based on the CA technology, if a UE aggregates multiple carriers to transmit data, the UE requires multiple pieces of corresponding PDCCH signaling.

In an LTE-A system, resources can be scheduled in two modes. One mode is Same-CC Scheduling (SCS), which means that the PDCCH signaling on a carrier may be used to schedule only resources of this carrier and the uplink carrier corresponding to this carrier; the other mode is Cross-CC Scheduling (CCS), which means that the PDCCH signaling on a carrier may be used to schedule the resources of this carrier or other carriers. In CCS mode, a Carrier Indicator Field (CIF) needs to be added to UE-specific PDCCH signaling to indicate resources of which carrier are currently scheduled by the PDCCH signaling. Specially, no CIF is added to PDCCH signaling shared by multiple UEs so that the UEs in an LTE-A system and the UEs in an LTE system can coexist.

The base station sends semi-static Radio Resource Control (RRC) signaling to the UE, indicating whether the resource scheduling mode currently applied by the UE is CCS or SCS. When the UE uses the SCS mode to schedule resources in the RRC-idle state or the RRC-connected state, the PDCCH signaling includes no CIF. When the UE uses the CCS mode to schedule resources in the connected state, the PDCCH signaling includes a CIF. After the base station sends the semi-static RRC signaling to the UE, if the UE receives the semi-static RRC signaling, the UE detects and parses the PDCCH signaling according to the resource scheduling mode indicated in the semi-static RRC signaling. However, after the base station sends the semi-static RRC signaling, the base station is not sure whether the UE has received the semi-static RRC signaling correctly until the base station receives RRC Connection Reconfiguration Complete signaling (RRC Connection Reconfiguration Complete signaling) returned by the UE, and the scheduling on the base station is uncertain in the period from sending the semi-static RRC signaling to receiving the RRC Connection Reconfiguration Complete signaling.

The following problems exist in the prior art. The scheduling on the base station is uncertain in the period from sending the semi-static RRC signaling to receiving the RRC Connection Reconfiguration Complete signaling returned by the UE, which causes the UE to parse the signaling incorrectly.

SUMMARY OF THE INVENTION

Embodiments of the present invention provide a method, a base station, a UE, and a system for sending PDCCH signaling to overcome scheduling uncertainty on the base station.

Embodiments of the present invention provide a method, a base station, a UE, and a system for receiving PDCCH signaling to prevent the UE from parsing the PDCCH signaling incorrectly.

A method for sending PDCCH signaling according to an embodiment of the present invention includes determining locations of a first search space and a second search space of a UE; and sending only PDCCH signaling with no CIF to the UE in a physically overlapped region between the first search space and the second search space if the physically overlapped region exists and a length of the PDCCH signaling with no CIF in the first search space is equal to a length of PDCCH signaling with the CIF in the second search space.

Another method for sending PDCCH signaling according to an embodiment of the present invention includes determining locations of a first search space and a second search space of a UE; and sending only PDCCH signaling with a CIF to the UE in a physically overlapped region between the first search space and the second search space after receiving RRC Connection Reconfiguration Complete signaling sent by the UE if the physically overlapped region exists and a length of PDCCH signaling with no CIF in the first search space is equal to a length of the PDCCH signaling with the CIF in the second search space.

Another method for sending PDCCH signaling according to an embodiment of the present invention includes determining locations of a first search space and a second search space of a UE; and sending third PDCCH signaling or fourth PDCCH signaling to the UE in a physically overlapped region between the first search space and the second search space within a time interval from sending RRC signaling to the UE to receiving RRC Connection Reconfiguration Complete signaling returned by the UE. The third PDCCH signaling is PDCCH signaling with no Carrier Indication Field (CIF) and the fourth PDCCH signaling is PDCCH signaling with the CIF if a length of first PDCCH signaling in the first search space is equal to a length of second PDCCH signaling in the second search space and the physically overlapped region exists. The first PDCCH signaling is PDCCH signaling with no CIF, the second PDCCH signaling is PDCCH signaling with the CIF, a length of the third PDCCH signaling is unequal to a length of the fourth PDCCH signaling, the length of the third PDCCH signaling is different from the length of the first PDCCH signaling, and the length of the fourth PDCCH signaling is different from the length of the first PDCCH signaling.

A method for receiving PDCCH signaling according to an embodiment of the present invention includes receiving only PDCCH signaling with no CIF in a physically overlapped region between a first search space and a second search space and parsing the PDCCH signaling with no CIF according to only a set rule of parsing PDCCH signaling with no CIF if the physically overlapped region exists and a length of the PDCCH signaling with no CIF in the first search space of a UE is equal to a length of PDCCH signaling with the CIF in the second search space of the UE.

Another method for receiving PDCCH signaling according to an embodiment of the present invention includes receiving PDCCH signaling with a CIF in a physically overlapped region between a first search space and a second search space after a UE parses RRC signaling from a base station correctly, and parsing the PDCCH signaling with the CIF according to only a set rule of parsing PDCCH signaling with the CIF if the physically overlapped region exists and a length of PDCCH signaling with no CIF in the first search space of the UE is equal to a length of the PDCCH signaling with the CIF in the second search space of the UE.

A base station according to an embodiment of the present invention includes a first determining module that is configured to determine locations of a first search space and a second search space of a UE. A first sending module is configured to send only PDCCH signaling with no CIF to the UE in a physically overlapped region between the first search space and the second search space if the physically overlapped region exists and a length of the PDCCH signaling with no CIF in the first search space is equal to a length of PDCCH signaling with the CIF in the second search space after the first determining module determines the locations of the first search space and second search space of the UE.

Another base station according to an embodiment of the present invention includes a second determining module that is configured to determine locations of a first search space and a second search space of a UE. A second sending module is configured to send third PDCCH signaling or fourth PDCCH signaling to the UE in a physically overlapped region between the first search space and the second search space within a time interval from sending RRC signaling to the UE to receiving RRC Connection Reconfiguration Complete signaling returned by the UE after the first determining module determines the locations of the first search space and the second search space of the UE. The third PDCCH signaling is PDCCH signaling with no CIF and the fourth PDCCH signaling is PDCCH signaling with the CIF if a length of first PDCCH signaling in the first search space is equal to a length of second PDCCH signaling in the second search space, where the first PDCCH signaling is PDCCH signaling with no CIF and the second PDCCH signaling is PDCCH signaling with the CIF, and a length of the third PDCCH signaling is unequal to a length of the fourth PDCCH signaling, and the length of the third PDCCH signaling is different from the length of the first PDCCH signaling, and the length of the fourth PDCCH signaling is different from the length of the first PDCCH signaling.

Another base station according to an embodiment of the present invention includes a third determining module that is configured to determine locations of a first search space and a second search space of a UE. A third sending module is configured to send only PDCCH signaling with a CIF to the UE in a physically overlapped region between the first search space and the second search space after receiving RRC Connection Reconfiguration Complete signaling sent by the UE if the physically overlapped region exists and a length of PDCCH signaling with no CIF in the first search space is equal to a length of the PDCCH signaling with the CIF in the second search space after the third determining module determines the locations of the first search space and the second search space of the UE.

A UE according to an embodiment of the present invention includes a receiving module that is configured to receive PDCCH signaling with no CIF sent by a base station in a physically overlapped region between a first search space and a second search space if the physically overlapped region exists and a length of the PDCCH signaling with no CIF in the first search space is equal to a length of PDCCH signaling with the CIF in the second search space. A parsing module is configured to parse the PDCCH signaling received by the receiving module according to only a set rule of parsing PDCCH signaling with no CIF.

Another UE according to an embodiment of the present invention includes a second receiving module that is configured to receive PDCCH signaling with a CIF in a physically overlapped region between a first search space and a second search space after the UE parses RRC Configuration signaling from a base station correctly if the physically overlapped region exists and a length of PDCCH signaling with no CIF in the first search space of the UE is equal to a length of the PDCCH signaling with the CIF in the second search space of the UE. A second parsing module is configured to parse the PDCCH signaling with the CIF received by the receiving module according to only a set rule of parsing PDCCH signaling with the CIF.

A communication system according to an embodiment of the present invention includes the foregoing base station and the UE, where the base station includes the first determining module and the first sending module, and the UE includes the receiving module and the parsing module.

Another communication system according to an embodiment of the present invention includes a UE and the foregoing base station which includes the second determining module and the second sending module.

With the method, base station, UE, and system for sending and receiving PDCCH signaling according to the embodiments of the present invention, the scheduling uncertainty of the base station is prevented, and the UE can determine whether the PDCCH signaling includes a CIF or not upon receiving the PDCCH signaling, and can parse the signaling correctly.

BRIEF DESCRIPTION OF THE DRAWINGS

To make the technical solution of the present invention clearer, the following describes the accompanying drawings involved in the description of the embodiments of the present invention. Apparently, the accompanying drawings described below involve in some embodiment of the present invention, and persons skilled in the art can derive other drawings from such accompanying drawings without any creative effort.

DETAILED DESCRIPTION OF ILLUSTRATIVE EMBODIMENTS

Figure 1:
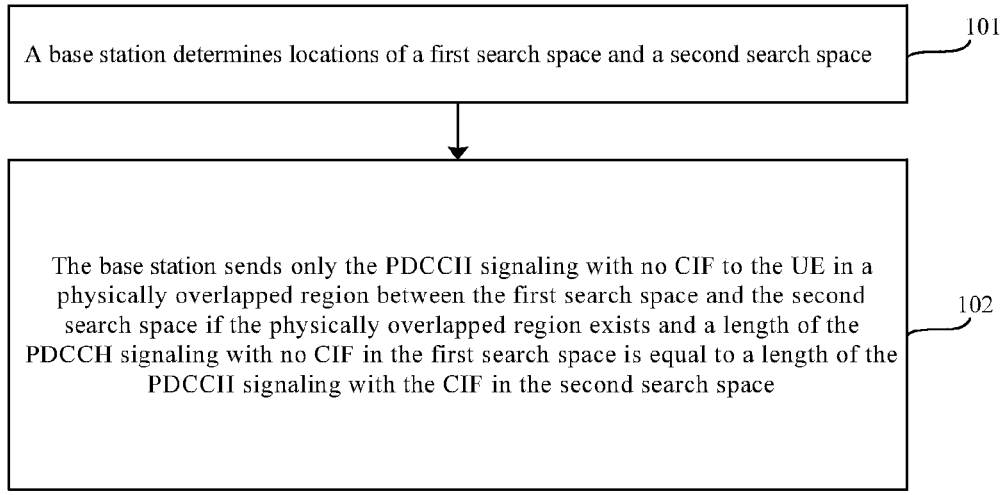
FIG. 1 is a flowchart of a method for sending PDCCH signaling according to an embodiment of the present invention.

To make the objective, technical solution, and merits of the present invention clearer, the following describes the technical solution of the present invention in detail with reference to embodiments and accompanying drawings. Evidently, the embodiments are exemplary only part of but not all of embodiments of the present invention. All other embodiments, which can be derived by those skilled in the art from the embodiments provided herein without any creative effort, shall fall within the protection scope of the present invention.

In a communication system such as a Long Term Evolution (LTE) system, a base station, such as an eNB, schedules resources on one carrier with a UE. The minimum time unit for the base station to schedule resources is a subframe which is 1 millisecond in length. After the scheduled UE demodulates and decodes PDCCH signaling in the search space of the PDCCH according to the length of the PDCCH signaling and the Control Channel Element (CCE) level of the search space, and the scheduled UE uses a Radio Network Temporary Identifier (RNTI) of the scheduled UE to perform descrambling and Cyclic Redundancy Check (CRC) to check and determines whether currently detected PDCCH signaling is PDCCH signaling of the scheduled UE. If the scheduled UE determines that the currently detected PDCCH signaling is the PDCCH signaling of the UE, the UE further performs follow-up operations. The PDCCH signaling carries time-frequency resource allocation information indicative of a physical data channel (either an uplink physical data channel or a downlink physical data channel).

A search space is a set of logically consecutive CCEs. A CCE is a minimum unit that makes up PDCCH signaling. The PDCCH signaling of the UE may be transmitted by using four CCE levels: 1, 2, 4, and 8 respectively. Different CCE levels have different encoding rates. The PDCCH signaling at each different CCE level has a different search space, but physically, the different search spaces concerning the PDCCH signaling may overlap each other. That is, different search spaces may include CCEs, part of or all indices of which are the same.

Search spaces are classified into Common Search Space (CSS) and UE-specific Search Space (UESS). A CSS and a UESS are different search spaces, but may physically overlap. That is, different search spaces may include CCEs, part of or all indices of which are the same. The CSS is a space all UEs need to detect. A CSS includes 16 CCEs, and in the CSS only PDCCH signaling whose CCE level is 4 or 8 can be transmitted. The number of searches in the CSS corresponding to CCE level 4 is 4, and the number of searches in the CSS corresponding to CCE level 8 is 2 (4*4=8*2=16). Each UE has a specific UESS. Each UESS is decided by a specific RNTI and a subframe number. The CCE level in a UESS is 1, 2, 4, or 8, and the number of searches in the UESS corresponding to CCE levels 1, 2, 4, and 8 is 6, 6, 2, and 2 respectively.

The Downlink Control Information (DCI) format of the PDCCH signaling varies with a transmission mode of scheduling data and a resource allocation mode, and so on. For example, the DCI format may include DCI format 0, DCI format 1A, DCI format 1B, DCI format 1C, DCI format 1D, DCI format 1, DCI format 2, DCI format 2A, DCI format 2, and DCI format 3A. Generally, the length of PDCCH signaling in different formats varies, and the RNTI for scrambling the PDCCH signaling may also vary. In some scenarios, the PDCCH signaling in different DCI formats may have the same length.

The PDCCH signaling for scheduling information shared by multiple UEs may be placed in a CSS for transmission, and the RNTI used for scrambling the PDCCH signaling may also be an RNTI shared by multiple UEs. For example, the RNTI shared by multiple UEs may be a paging RNTI (paging RNTI), system information RNTI (system information RNTI), Random Access Channel Response RNTI (RACH Response RNTI), or Transmission Power Control (TPC)-related RNTI.

The PDCCH signaling scrambled by using a UE-specific RNTI is generally placed in a UESS for transmission, for example, PDCCH signaling scrambled by using a Semi-Persistent Scheduling-Cell-RNTI (SPS-C-RNTI) or Cell-RNTI (C-RNTI).

The PDCCH signaling in DCI format 1A may be transmitted in the CSS, and the PDCCH signaling is scrambled by using a paging RNTI, system information RNTI, or RACH Response RNTI. The PDCCH signaling in DCI format 1A may also be transmitted in the UESS, and the PDCCH signaling is scrambled by using a cell RNTI or an SPS-C-RNTI.

The length of the PDCCH signaling in DCI format 1A is the same as the length of the PDCCH signaling in the following formats: DCI format 3, DCI format 3A, and DCI format 0. The PDCCH signaling in DCI format 1A is differentiated from the PDCCH signaling in DCI format 0 by using a header discrimination bit. The PDCCH signaling in DCI format 1A and the PDCCH signaling in DCI format 0 are differentiated from the PDCCH signaling in DCI format 3 and the PDCCH signaling in DCI format 3A by using different RNTIs to scramble.

The PDCCH signaling in DCI format 1A scrambled by using the cell RNTI and the PDCCH signaling in DCI format 1A scrambled by using the SPS-C-RNTI, may be transmitted in the UESS or the CSS, which does not increase the number of times that the PDCCH signaling is detected. The number of times that the UE detects PDCCH signaling is related to the length of the signaling. One more type of signaling length increases the number of times that detection is performed by one series. The PDCCH signaling in DCI format 3 or the PDCCH signaling in DCI format 3A transmitted in the CSS always needs to be detected, and the length of such two types of PDCCH signaling is equal to the length of the PDCCH signaling in DCI format 0 and the PDCCH signaling in DCI format 1A. Therefore, the number of times that the UE detects PDCCH signaling does not increase.

The base station configures one of seven transmission modes for the UE through a semi-static RRC signaling according to a data transmission mode and a resource allocation mode. In each transmission mode, the UE needs to detect the PDCCH signaling in at least two DCI formats. The PDCCH signaling in one DCI format is related to the transmission mode allocated to the UE currently, and the PDCCH signaling in the other DCI format is the PDCCH signaling in DCI format 1A and the PDCCH signaling in DCI format 0 that are unrelated to the transmission mode allocated to the UE currently. That is, the UE needs to detect the PDCCH signaling in DCI format 1A and the PDCCH signaling in DCI format 0 regardless of the transmission mode allocated to the UE. For example, if the base station allocates transmission mode 3, that is, open-loop Multiple Input Multiple Output (MIMO) transmission mode, to the UE, the UE needs to detect the PDCCH signaling in DCI format 2A, and the UE also needs to detect the PDCCH signaling in DCI format 0 and the PDCCH signaling in DCI format 1A, where the PDCCH signaling in DCI format 2A is related to transmission mode 3. If the base station allocates transmission mode 4, that is, a closed-loop MIMO transmission mode, to the UE, the UE needs to detect the PDCCH signaling in DCI format 2, and the UE also needs to detect the PDCCH signaling in DCI format 0 and the PDCCH signaling in DCI format 1A, where PDCCH signaling in DCI format 2 is related to transmission mode 4.

Assuming scenario A: In the period from the base station sending semi-static RRC signaling that is used for notifying the UE of the current resource scheduling mode to the base station receiving RRC Connection Reconfiguration Complete signaling returned by the UE, and after the base station receives the RRC Connection Reconfiguration Complete signaling returned by the UE, it is possible that the length of the PDCCH signaling, in DCI format 0 with no CIF or DCI format 1A with no CIF, in the CSS of the current carrier is equal to the length of PDCCH signaling with the CIF, in another format, in the UESS of the current carrier, where the latter PDCCH signaling is used to schedule another carrier whose bandwidth is less than the bandwidth of the current carrier. If a physically overlapped region between the CSS and the UESS exists, the UE incorrectly parses the signaling and mistakenly determines that the PDCCH signaling detected in the physically overlapped region is used to schedule the resources on the current carrier or schedule the resources on another carrier whose bandwidth is less than the bandwidth on the current carrier.

For example, one piece of signaling is PDCCH signaling in DCI format 0 with no CIF or DCI format 1A with no CIF in the CSS of the current carrier CC1 and the other piece of signaling is PDCCH signaling with the CIF that is in another format in the UESS of CC1 and is used to schedule carrier CC2 whose bandwidth is less than the bandwidth of CC1. Because the bandwidth of the carrier CC2 that is scheduled is less than the bandwidth of the carrier CC1, the number of resource allocation bits required in the PDCCH signaling is smaller, and therefore it is possible that the length of the PDCCH signaling in DCI format 0 with no CIF or DCI format 1A with no CIF in the CSS of the current carrier CC1 is equal to the length of the PDCCH signaling with the CIF that is in another format in the UESS of CC1 and is used to schedule carrier CC2 whose bandwidth is less than the bandwidth of CC1. When a physically overlapped region between the CSS and the UESS exists, the UE may parse the signaling incorrectly and mistakenly determine that the PDCCH signaling detected in the physically overlapped region is used to schedule the resources in CC1 or schedule the resources in CC2.

Taking downlink data as an example, once the UE parses the PDCCH signaling incorrectly, the UE will receive downlink data on a wrong carrier. Subsequently, the UE may feedback a Negative Acknowledgement (NACK) message to the base station, and the base station may resend the data. However, the UE is still unsure how to parse the PDCCH signaling correctly, and the UE is still unable to receive the data correctly. The buffer of the UE keeps storing the incorrect data until the base station completes the maximum number of retransmissions, which leads to Hybrid Automatic Repeat-reQuest (HARQ) buffer pollution of the UE.

The following describes a solution to the foregoing problem in detail. In the embodiments of the present invention, for example, it is assumed that in CCS data scheduling mode, the PDCCH signaling in DCI format 1A or DCI format 0 transmitted in the CSS does not include a CIF, and the PDCCH signaling in DCI format 1A or DCI format 0 can be used to schedule only the resources on the current carrier of the PDCCH signaling or the resources on the uplink carrier corresponding to the carrier; or it is assumed that in CCS data scheduling mode, the PDCCH signaling transmitted in a certain UESS does not include a CIF, and the PDCCH signaling can be used to schedule only the resources on the current carrier of the PDCCH signaling or the resources on the uplink carrier corresponding to the carrier. Other scenarios may also be included.

FIG. 1 is a flowchart of a method for sending PDCCH signaling according to an embodiment of the present invention. The method includes the following steps.

Step 101: The base station determines locations of a first search space and a second search space. The PDCCH signaling transmitted in the first search space may include no CIF, and the first search space may be a CSS and/or UESS; the PDCCH signaling transmitted in the second search space may include a CIF, and the second search space may be a UESS.

The first search space may be at least one of a CSS and a UESS.

Step 102: The base station sends PDCCH signaling with no CIF to the UE in a physically overlapped region between the first search space and the second search space if the physically overlapped region exists and a length of the PDCCH signaling with no CIF in the first search space is equal to a length of the PDCCH signaling with the CIF in the second search space.

The base station may determine that search spaces in which different PDCCH signaling is may overlap, that is, part or all of CCEs with the same indices are physically overlapped region, by determining that different search spaces include CCEs part or all of indices of which are the same.

The method may further include determining the physically overlapped region between the first search space and the second search space according to the locations of the first search space and the second search space.

As an example, determining the physically overlapped region between the first search space and the second search space includes determining that the first search space and the second search space include at least one CCE with the same index, where the at least one CCE with the same index is the physically overlapped region.

The PDCCH signaling sent by the base station may include resource allocation information and other control information such as carrier activation or deactivation information, and information for triggering a physical random access process.

As an example, in a physical region other than the foregoing physically overlapped region in the search space of the user equipment, the base station may send the PDCCH signaling according to the prior art, which is not detailed here.

The embodiment shown in FIG. 1 restricts that in the physically overlapped region between two search spaces the PDCCH signaling of one of the search spaces is transmitted, which is essentially a search space orthogonalization method. Another search space orthogonalization method may be applied, which makes two search spaces not overlap and therefore solves the problem of uncertainty of base station scheduling that is caused by equal length, namely, the length of the PDCCH signaling with no CIF in the first search space is equal to the length of the PDCCH signaling with the CIF in the second search space. For example, if a CSS overlaps a UESS physically, the CSS location remains unchanged, and a configuration parameter is set to prevent overlap between the UESS and the CSS without changing the CCE size of the CSS and the UESS, specifically, to make the UESS and the CSS place in tandem.

Because the base station uses the PDCCH signaling with no CIF for scheduling before and after RRC configuration, the scheduling mode of the PDCCH signaling before the RRC configuration is consistent with the scheduling mode after the RRC configuration, and therefore the scheduling uncertainty is prevented. Because the UE uses the PDCCH signaling with no CIF for parsing before and after the RRC configuration, the parsing of the PDCCH signaling on the base station is consistent with the parsing of the PDCCH signaling on the UE, and therefore a parsing error is prevented. For example, when the UE fails to receive the RRC configuration signaling correctly, the UE still parses the signaling according to a rule of parsing PDCCH signaling with no CIF, and if the base station has performed the scheduling using newly configured PDCCH signaling with the CIF, the UE parses the signaling incorrectly. If the UE receives the RRC configuration signaling correctly but the base station still performs the scheduling using the PDCCH signaling with no CIF, the UE parses the signaling according to a rule of parsing PDCCH signaling with the CIF, and therefore the parsing is incorrect.

Therefore, by sending only the PDCCH signaling with no CIF in the physically overlapped region, the embodiment of the present invention prevents uncertainty, and prevents the UE from parsing the signaling incorrectly.

Figure 5:
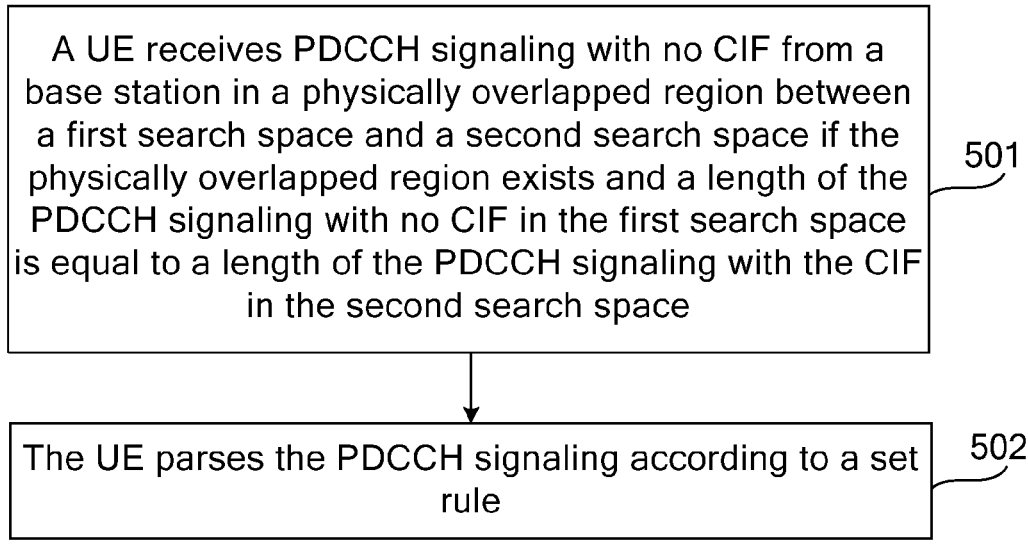
FIG. 5 is a flowchart of a method for receiving PDCCH signaling according to an embodiment of the present invention.

FIG. 5 is a flowchart of a method for receiving PDCCH signaling according to an embodiment of the present invention. The method includes the following steps.

Step 501: If a physically overlapped region between the first search space and the second search space exists and the length of the PDCCH signaling with no CIF in the first search space is equal to the length of the PDCCH signaling with the CIF in the second search space, the UE receives, in the physically overlapped region, the PDCCH signaling with no CIF sent by the base station.

Step 502: The UE parses the PDCCH signaling according to a set rule. The set rule may specify that the base station and the UE parse the PDCCH signaling according to a predetermined meaning of each field in the PDCCH signaling.

If the PDCCH signaling sent by the base station includes no CIF, the UE can parse the PDCCH signaling according to a rule of parsing PDCCH signaling with no CIF after the UE receives the PDCCH signaling. The specific rule of the parsing is negotiated by the UE and the base station beforehand.

In the foregoing embodiment, in the case that a physically overlapped region between the first search space and the second search space exists and the length of the PDCCH signaling with no CIF in the first search space is equal to the length of the PDCCH signaling with the CIF in the second search space, the base station is required to send the PDCCH signaling with no CIF to the UE. In this way, only the PDCCH signaling with no CIF is sent to the UE, and the UE is sure that the PDCCH signaling received in the physically overlapped region includes no CIF, and the resources allocated in the PDCCH signaling are surely resources that come from the carrier that is used to bear the PDCCH signaling, which prevents the UE from parsing the signaling incorrectly.

For example, in the period from the base station sending semi-static RRC signaling that is used to notify the UE of the current resource scheduling mode to the base station receiving RRC Connection Reconfiguration Complete signaling returned by the UE, and after the base station receives the RRC Connection Reconfiguration Complete signaling returned by the UE, if the length of PDCCH signaling with no CIF, in DCI format 0 or DCI format 1A, in the CSS of the current carrier in the UE that is used to bear PDCCH signaling, is equal to the length of PDCCH signaling with the CIF, in another format, in the UESS of the UE on the current carrier, where the PDCCH signaling with the CIF is used to schedule another carrier whose bandwidth is less than the bandwidth on the current carrier, and if a physically overlapped region between the CSS and the UESS exists, the base station sends PDCCH signaling with no CIF in the physically overlapped region, and the PDCCH signaling carries the resource allocation information specific to the UE. In an embodiment, the UE and the base station may negotiate beforehand that all PDCCH signaling sent in the physically overlapped region includes no CIF. Therefore, after receiving the PDCCH signaling, the UE is sure that the PDCCH signaling includes no CIF, and the resources allocated in the PDCCH signaling surely resources that come from the carrier that is used to bear the PDCCH signaling, which prevents the UE from parsing the signaling incorrectly.

In the embodiments shown in FIG. 1 and FIG. 5, the first search space may be a CSS, the second search space is a UESS, and the CCE level of the first search space and the second search space may be 4 or 8. Alternatively, the first search space and the second search space include two UESSs that are used to schedule different CCs of the UE.

As described above, The UE may determine that search spaces in which different PDCCH signaling is may overlap, that is, part or all of CCEs with the same indices are physically overlapped region, by determining that different search spaces include CCEs part or all of indices of which are the same.

The foregoing method may further include determining locations of a first search space and a second search space of a UE and determining the physically overlapped region between the first search space and the second search space according to the locations of the first search space and the second search space.

As an example, determining the physically overlapped region between the first search space and the second search space includes determining that the first search space and the second search space comprise at least one CCE with the same index, where the at least one CCE with the same index is the physically overlapped region.

The UE knows that the length of the PDCCH signaling with no CIF in the first search space is equal to the length of the PDCCH signaling with the CIF in the second search space. For example, as described above, the base station configures one of seven transmission modes for the UE through semi-static RRC signaling according to the data transmission mode and the resource allocation mode. The UE needs to detect the PDCCH signaling in at least two DCI formats to obtain the length of the PDCCH signaling.

In the embodiment shown in FIG. 1, if the first search space is a CSS and the second search space is a UESS, the restriction on the second search space is not intense. That is because: in the second search space, even if the length of the PDCCH signaling at CCE level 4 or 8 is equal to the length of the PDCCH signaling with no CIF in the CSS, which makes the base station unable to transmit the PDCCH signaling in the physically overlapped region, the base station can still transmit the PDCCH signaling at CCE level 1 or 2 in the physically overlapped region. Even if the length of the PDCCH signaling at CCE level 4 is equal to the length of the PDCCH signaling with no CIF in the CSS, which makes the base station unable to transmit the PDCCH signaling in the physically overlapped region, the base station may still transmit the PDCCH signaling at CCE level 8 so long as the PDCCH signaling at CCE level 8 is transmitted in the second search space which does not overlap the CSS.

In the foregoing embodiment, in the period from the base station sending the RRC signaling to the base station receiving the RRC Connection Reconfiguration Complete signaling returned by the UE, the base station clearly knows the receiving mode of the UE, which solves the problem that the UE incorrectly parses the control signaling that is transmitted by the base station.

In addition, the scheduling freedom of the first search space is reserved completely, namely, no scheduling restriction is imposed on the first search space, which overcomes the scheduling uncertainty of the base station during the RRC reconfiguration period to the greatest extent.

Figure 2:
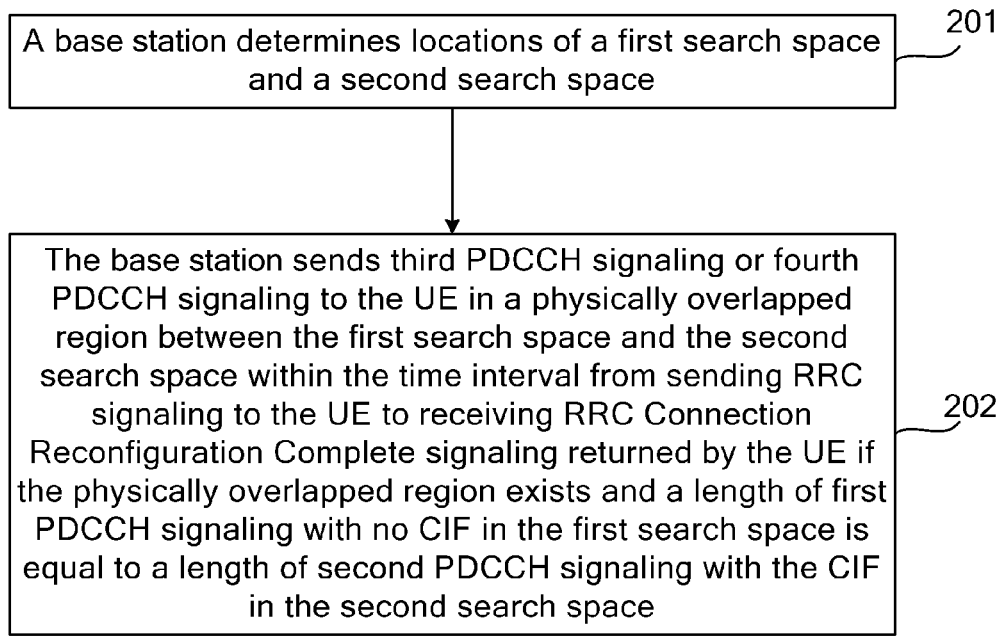
FIG. 2 is a flowchart of a method for sending PDCCH signaling according to another embodiment of the present invention.

FIG. 2 is a flowchart of a method for sending PDCCH signaling according to another embodiment of the present invention. The method includes the following steps.

Step 201: A base station determines locations of a first search space and a second search space.

Step 202: The base station sends third PDCCH signaling or fourth PDCCH signaling to the UE in a physically overlapped region between the first search space and the second search space within a time interval from sending Radio Resource Control (RRC) signaling to the UE to receiving RRC Connection Reconfiguration Complete signaling returned by the UE, wherein the third PDCCH signaling is PDCCH signaling with no Carrier Indication Field (CIF) and the fourth PDCCH signaling is PDCCH signaling with the CIF if a length of first PDCCH signaling in the first search space is equal to a length of second PDCCH signaling in the second search space and the physically overlapped region exists, wherein the first PDCCH signaling is PDCCH signaling with no CIF, and the second PDCCH signaling is PDCCH signaling with the CIF, and a length of the third PDCCH signaling is unequal to a length of the fourth PDCCH signaling, and the length of the third PDCCH signaling is different from the length of the first PDCCH signaling, and the length of the fourth PDCCH signaling is different from the length of the first PDCCH signaling.

After receiving the RRC Connection Reconfiguration Complete signaling returned by the UE, the base station sends the second PDCCH signaling, namely, the PDCCH signaling with the CIF to the UE. The third PDCCH signaling or the fourth PDCCH signaling may be other types of PDCCH signaling than the first PDCCH signaling and the second PDCCH signaling. The other types of PDCCH signaling than the first PDCCH signaling and the second PDCCH signaling is PDCCH signaling which is not parsed by the UE incorrectly. For example, it is assumed that PDCCH signaling in two formats exists currently under each transmission mode; in two types of PDCCH signaling (with the CIF) under a certain transmission mode corresponding to a carrier scheduled across carriers, assuming that the length of one type of PDCCH signaling is equal to the length of the PDCCH signaling with no CIF and in a certain format in the CSS of a carrier of the PDCCH, the eNB may send the other type of PDCCH signaling under the current mode, and the length of the other type of PDCCH signaling is unequal to the length of the PDCCH signaling with no CIF in a certain format in the CSS of a carrier of the PDCCH. In this case, the UE may not parse the PDCCH signaling incorrectly.

Alternatively, two types of UE-specific PDCCH signaling with no CIF may exist in the CSS of the carrier of the PDCCH, and one type may be parsed by the UE incorrectly. If one type is parsed by the UE incorrectly, the base station may send the other type of PDCCH signaling with no CIF to the UE.

Figure 6:
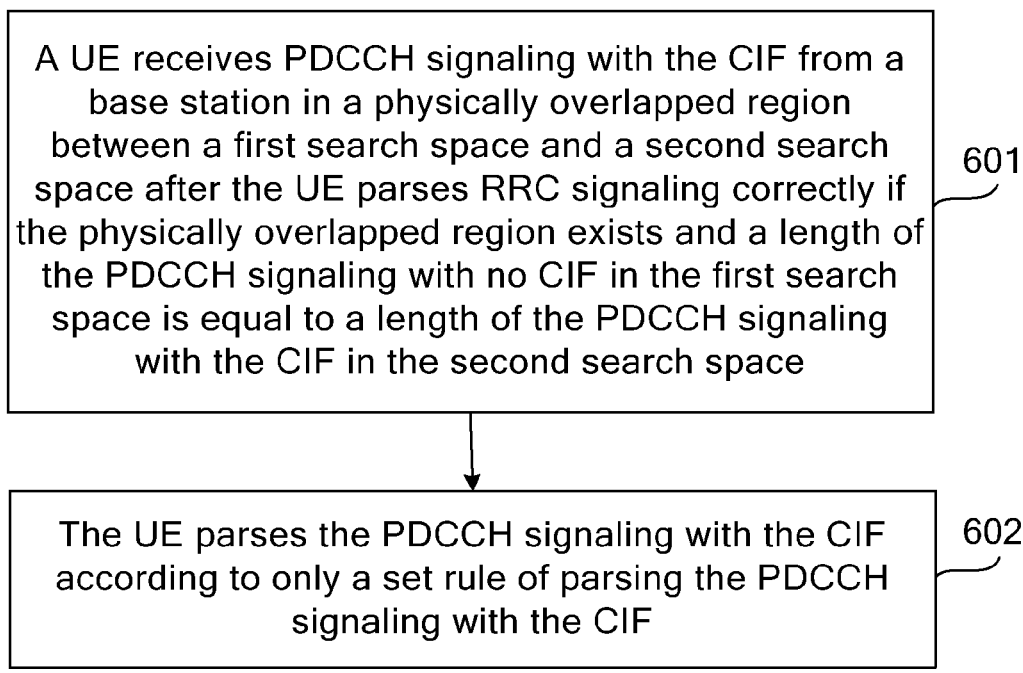
FIG. 6 is a flowchart of a method for receiving PDCCH signaling according to another embodiment of the present invention.

FIG. 6 is a flowchart of a method for receiving PDCCH signaling according to another embodiment of the present invention. The method includes the following steps.

Step 601: If the length of the PDCCH signaling with no CIF in a first search space is equal to the length of the PDCCH signaling with the CIF in a second search space, and a physically overlapped region exists between the first search space and the second search space, a UE receives, in the physically overlapped region, PDCCH signaling with the CIF sent by a base station after the UE parses RRC signaling correctly.

Step 602: The UE parses the PDCCH signaling with the CIF according to only a set rule of parsing PDCCH signaling with the CIF.

If the PDCCH signaling sent by the base station includes the CIF, the UE may parse the PDCCH signaling according to a rule of parsing PDCCH signaling with the CIF after the UE receives the PDCCH signaling. The specific rule of parsing which the UE uses is negotiated by the UE and the base station beforehand.

In the foregoing embodiment, in a case that the length of the PDCCH signaling with no CIF in the first search space is equal to the length of the PDCCH signaling with the CIF in the second search space and a physically overlapped region exists between the first search space and the second search space, the base station cannot send the PDCCH signaling with the CIF within a time interval from the base station sending the RRC signaling to the base station receiving the RRC Connection Reconfiguration Complete signaling returned by the UE. The UE may not receive RRC configuration signaling correctly and therefore regard that the received PDCCH signaling includes no CIF, which leads to a parsing error. Therefore, after receiving the RRC Connection Reconfiguration Complete signaling returned by the UE, the base station may send the PDCCH signaling with the CIF to the UE.

However, within a time interval from the base station sending RRC signaling to the base station receiving the RRC Connection Reconfiguration Complete signaling returned by the UE, the base station may send only other types of PDCCH signaling than the first PDCCH signaling and the second PDCCH signaling to the UE. For the UE side, after parsing the RRC configuration signaling correctly, the UE receives only the PDCCH signaling with the CIF sent by the base station.

In the embodiment shown in FIG. 2, the first search space may be a CSS, the second search space is a UESS, and the CCE level of the first search space and the second search space is 4 or 8. Alternatively, the first search space and the second search space include two UESSs that are used to schedule a different CC of the UE.

If the first search space is a CSS and the second search space is a UESS, the method shown in FIG. 2 is applicable, which does not increase the number of times that PDCCH signaling is checked in the first search space. In addition, the scheduling freedom of the second search space is greater than that of the first search space (because the second search space can implement cross-carrier scheduling, but the first search space allows only same-carrier scheduling). Therefore, this solution reserves the scheduling freedom of the second search space completely, and does not impose any scheduling restriction on the second search space.

Figure 3:
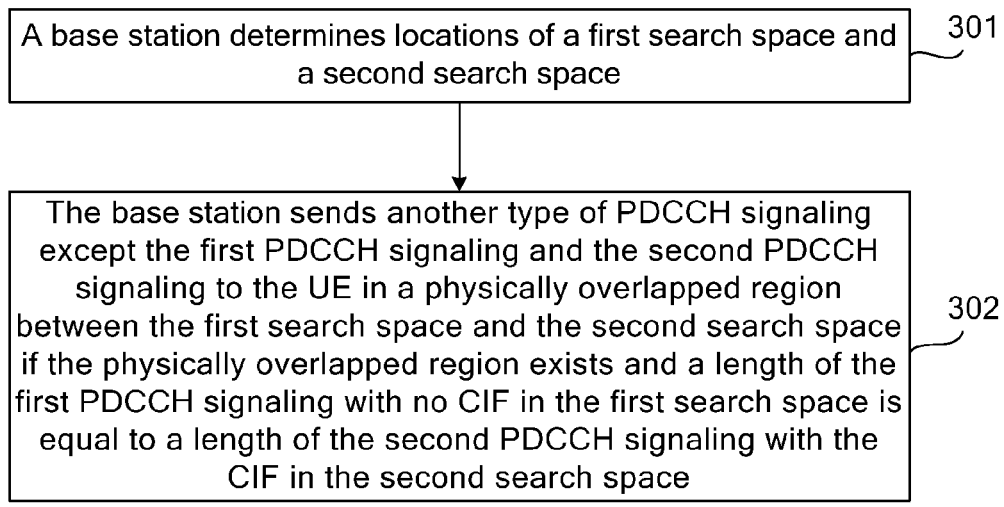
FIG. 3 is a flowchart of a method for sending PDCCH signaling according to another embodiment of the present invention.

FIG. 3 is a flowchart of a method for sending PDCCH signaling according to another embodiment of the present invention. The method includes the following steps.

Step 301: A base station determines locations of a first search space and a second search space.

Step 302: If a length of the first PDCCH signaling with no CIF in the first search space is equal to a length of the second PDCCH signaling with the CIF in the second search space and a physically overlapped region between the first search space and the second search space exists, the base station sends, in the physically overlapped region, other types of PDCCH signaling than the first PDCCH signaling and the second PDCCH signaling to the UE within a time interval from the base station sending RRC signaling to the UE to the base station receiving RRC Connection Reconfiguration Complete signaling returned by the UE.

The other types of PDCCH signaling than the first PDCCH signaling and the second PDCCH signaling may be third PDCCH signaling with no CIF or fourth PDCCH signaling with the CIF. The length of the third PDCCH signaling with no CIF is unequal to the length of the fourth PDCCH signaling with the CIF.

The embodiment shown in FIG. 3 can solve the problem that exists in scenario B below.

Assuming scenario B: PDCCH signaling for scheduling two carriers has a respective and independent UESS on one carrier, and a physically overlapped region between the two UESSs exists. In this case, the problem of uncertainty of the scheduling within the period from the base station sending semi-static RRC signaling that is used to notify the UE of the current resource scheduling mode to the base station receiving RRC Connection Reconfiguration Complete signaling returned by the UE. For example, before the sending, the resource scheduling mode of the UE is SCS, and the PDCCH signaling transmitted by the base station to the UE includes no CIF. After the UE receives the semi-static RRC signaling that is used to notify the UE of the current resource scheduling mode, the resource scheduling mode of the UE changes to CCS.

When the base station does not receive the RRC Connection Reconfiguration Complete signaling returned by the UE, the base station is not sure whether the PDCCH signaling sent to the UE needs to include the CIF, which leads to scheduling uncertainty of the base station. After the UE receives the RRC configuration signaling from the base station correctly and changes the resource scheduling mode to CCS, the CIF may be added to the PDCCH signaling in the two UESSs above, the PDCCH signaling for scheduling different carriers is distinguished automatically, and the foregoing problem may not occur even if the length of one piece of PDCCH signaling with the CIF is equal to the length of another piece of PDCCH signaling with the CIF.

In scenario B, the problem still exists if the base station sends only the PDCCH signaling with the CIF or the PDCCH signaling with no CIF within a time interval from sending semi-static RRC signaling to receiving RRC Connection Reconfiguration Complete signaling returned by the UE. If the base station sends only the PDCCH signaling with no CIF within a time interval from the base station sending the semi-static RRC signaling to the base station receiving the RRC Connection Reconfiguration Complete signaling returned by the UE, but the UE has parsed the semi-static RRC signaling correctly, the UE regards that the received PDCCH signaling includes the CIF, which leads to a parsing error.

If the base station sends only the PDCCH signaling with the CIF within a time interval from the base station sending the semi-static RRC signaling to the base station receiving the RRC Connection Reconfiguration Complete signaling returned by the UE, but the UE has not parsed the semi-static RRC signaling correctly, the UE regards that the received PDCCH signaling includes no CIF, which leads to a parsing error.

If the embodiment shown in FIG. 3 is applied, namely, the base station sends other types of PDCCH signaling than the first PDCCH signaling and the second PDCCH signaling in the physically overlapped region, the scheduling uncertainty of the base station is prevented, and the parsing error on the UE is prevented.

After the base station receives the RRC Connection Reconfiguration Complete signaling returned by the UE, the resource scheduling mode of the UE changes to CCS. Even if a physically overlapped region between the two UESSs of the UE exists, the base station may not be uncertain of scheduling and the UE may not parse the signaling incorrectly because any PDCCH signaling under the CCS mode includes the CIF.

In the embodiment shown in FIG. 3, the first search space and the second search space include two UESSs that are used to schedule different CCs of the UE.

With the method shown in FIG. 3, the base station prevents the UE from parsing the signaling incorrectly, without specifying any activity of the UE, namely, without affecting operations of the UE. The method is simple, and operations are easy.

In an embodiment, a UE has two CCs: CC1 and CC2, PDCCH signaling is transmitted over CC1, and CC1 includes search space CSS, search space UESS1, and search space UESS2; the PDCCH signaling in the CSS on CC1 is used to schedule CC1 and the PDCCH signaling includes no CIF; the PDCCH signaling in UESS1 on CC1 is used to schedule CC1 and the PDCCH signaling includes no CIF;

the PDCCH signaling in UESS2 on CC1 is used to schedule CC2 across carriers and the PDCCH signaling includes the CIF.

In a scenario, if the length of the PDCCH signaling with no CIF in UESS1 is equal to the length of the PDCCH signaling with the CIF in UESS2, and a physically overlapped region between UESS1 and UESS2 exists, the base station sends, in the physically overlapped region, the PDCCH signaling with no CIF to the UE; and, if the length of the PDCCH signaling with no CIF in the CSS is equal to the length of the PDCCH signaling with the CIF in UESS2, and a physically overlapped region between the CSS and UESS2 exists, the base station sends, in the physically overlapped region, the PDCCH signaling with the CIF to the UE; therefore, if the length of the PDCCH signaling with no CIF in UESS1 is equal to the length of the PDCCH signaling with the CIF in UESS2, and is also equal to the length of the PDCCH signaling with the CIF in the CSS, and a physically overlapped region between UESS1, UESS2, and the CSS exists, the problem of uncertainty of the scheduling exists in the physically overlapped region between UESS1, UESS2, and the CSS.

Or, if the length of the PDCCH signaling with no CIF in UESS1 is equal to the length of the PDCCH signaling with the CIF in UESS2, and a physically overlapped region between UESS1 and UESS2 exists, the base station sends the PDCCH signaling with the CIF to the UE in the physically overlapped region; and, if the length of the PDCCH signaling with no CIF in the CSS is equal to the length of the PDCCH signaling with the CIF in UESS2, and a physically overlapped region between the CSS and UESS2 exists, the base station sends the PDCCH signaling with the CIF to the UE in the physically overlapped region; therefore, if the length of the PDCCH signaling with no CIF in UESS1 is equal to the length of the PDCCH signaling with the CIF in UESS2, and is also equal to the length of the PDCCH signaling with no CIF in the CSS, and a physically overlapped region between UESS1, UESS2, and the CSS exists, the problem of uncertainty of the scheduling exists in the physically overlapped region between UESS1, UESS2, and the CSS.

Based on the preceding case, in an embodiment of the present invention, the base station sends only the PDCCH signaling with no CIF to the UE or sends only the PDCCH signaling with the CIF to the UE in the physically overlapped region between UESS1, UESS2, and the CSS.

If the base station sends only the PDCCH signaling with no CIF to the UE in the physically overlapped region between UESS1, UESS2, and the CSS, the data is placed onto CC1 of the PDCCH first, which ensures the scheduling priority of CC1 and ensures smooth transition of the scheduling during the RRC reconfiguration.

If the base station sends only the PDCCH signaling with the CIF to the UE in the physically overlapped region between UESS1, UESS2, and the CSS, the base station ensures the scheduling freedom of the UESS of CC2 scheduled across carriers.

A method for sending PDCCH signaling according to an embodiment of the present invention includes determining locations of a first search space, a second search space, and a third search space of a UE and sending only PDCCH signaling with the CIF or only PDCCH signaling with the CIF to the UE in a physically overlapped region between the first search space, the second search space, and the third search space if the physically overlapped region exists and length of the PDCCH signaling with no CIF in the first search space is equal to length of the PDCCH signaling with no CIF in the third search space and is equal to length of the PDCCH signaling with the CIF in the second search space.

A method for receiving PDCCH signaling according to an embodiment of the present invention includes the following steps.

A UE receives PDCCH signaling with the CIF or PDCCH signaling with no CIF sent by a base station in a physically overlapped region between a first search space, a second search space, and a third search space if the physically overlapped region exists and length of the PDCCH signaling with no CIF in the first search space is equal to length of the PDCCH signaling with no CIF in the third search space and is equal to length of the PDCCH signaling with the CIF in the second search space.

The UE parses the PDCCH signaling according to a set rule.

A base station includes a sixth determining module, configured to determine locations of a first search space, a second search space, and a third search space of a UE and a sixth sending module, configured to send only PDCCH signaling with the CIF or only PDCCH signaling with no CIF to the UE in a physically overlapped region between the first search space, the second search space, and the third search space if the physically overlapped region exists and length of the PDCCH signaling with no CIF in the first search space is equal to length of the PDCCH signaling with no CIF in the third search space and is equal to length of the PDCCH signaling with the CIF in the second search space.

A UE includes a seventh receiving module, configured to receive PDCCH signaling with the CIF or PDCCH signaling with no CIF sent by a base station in a physically overlapped region between a first search space, a second search space, and a third search space if the physically overlapped region exists and length of the PDCCH signaling with no CIF in the first search space is equal to length of the PDCCH signaling with no CIF in the third search space and is equal to length of the PDCCH signaling with the CIF in the second search space. The UE also includes a seventh parsing module, configured to parse the PDCCH signaling according to a set rule.

Figure 4:
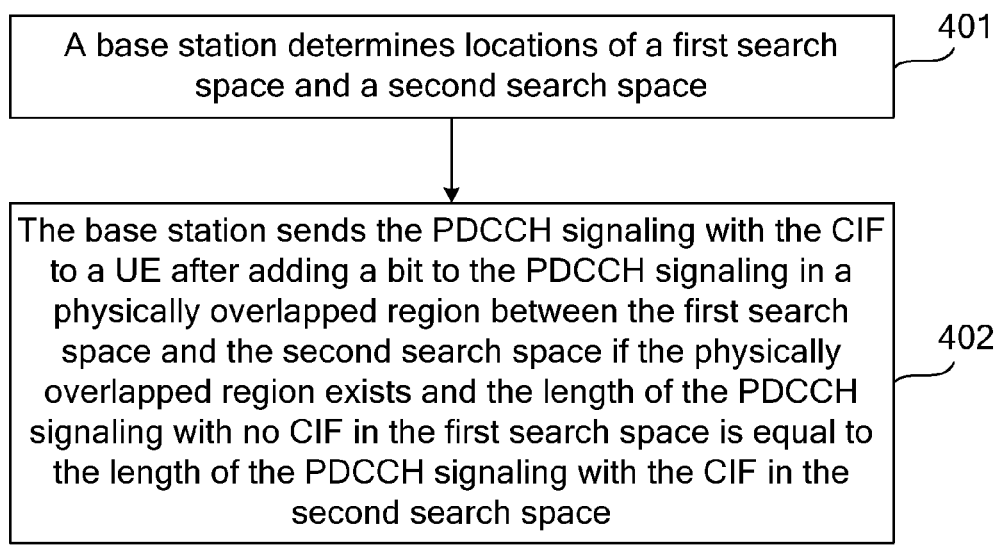
FIG. 4 is a flowchart of a method for sending PDCCH signaling according to another embodiment of the present invention.

FIG. 4 is a flowchart of a method for sending PDCCH signaling according to another embodiment of the present invention. The method includes the following steps.

Step 401: A base station determines locations of a first search space and a second search space.

Step 402: The base station sends the PDCCH signaling with the CIF to a UE after adding a bit to the PDCCH signaling in a physically overlapped region between the first search space and the second search space if the physically overlapped region exists and the length of the PDCCH signaling with no CIF in the first search space is equal to the length of the PDCCH signaling with the CIF in the second search space.

In this embodiment, the base station needs to add a bit to PDCCH signaling that is with the CIF and send the PDCCH signaling to the UE if a physically overlapped region between the first search space and the second search space exists and the length of the PDCCH signaling with no CIF in the first search space is equal to the length of the PDCCH signaling with the CIF in the second search space. Because the received PDCCH signaling with the CIF is longer than the PDCCH signaling with no CIF by one bit, the UE knows that the longer PDCCH signaling includes the CIF, and can parse the signaling correctly.

For example, in the period from the base station sending semi-static RRC signaling that is used to notify the UE of the current resource scheduling mode to the base station receiving RRC Connection Reconfiguration Complete signaling returned by the UE, and after the base station receives the RRC Connection Reconfiguration Complete signaling returned by the UE, if the length of PDCCH signaling, in DCI format 0 or DCI format 1A, with no CIF, and in the CSS of the current carrier of the UE, is equal to the length of PDCCH signaling that is with the CIF, in another format, and in the UESS of the current carrier of the UE, where the latter PDCCH signaling is used to schedule another carrier whose bandwidth is less than the bandwidth of the current carrier, and if a physically overlapped region between the CSS and the UESS exists (specific to CCE level 4 and CCE level 8), the base station sends the PDCCH signaling with the CIF to a UE after adding a bit to the PDCCH signaling in the physically overlapped region. In this way, the UE knows that the received PDCCH signaling includes the CIF, preventing a parsing error of the UE.

Assuming that the first search space is a CSS and the second search space is a UESS, in the method shown in FIG. 4, the bit is added only when the length of the PDCCH signaling with no CIF in the CSS is equal to the length of the PDCCH signaling with the CIF in the UESS. A physically overlapped region between the CSS and the UESS exists, and is specific to CCE level 4 or CCE level 8, which generates few overheads and does not affect the length of the PDCCH signaling with no CIF in the CSS. It is ensured that the PDCCH signaling with no CIF in the CSS is compatible with the format of the PDCCH signaling in the LTE system.

The search spaces may physically overlap each other on different CCE levels, and different CCE levels correspond to different rates of channel codes. Therefore, when the length of the PDCCH signaling with an added bit is equal to particular length, all the PDCCH signaling on different CCE levels passes through the C-RNTI check of the UE, namely, all such signaling is parsed by the UE as the PDCCH signaling of the UE. However, the PDCCH signaling sent by the base station has only one of the CCE levels. Therefore, the UE parses the PDCCH signaling incorrectly. Therefore, in this embodiment, if the length of PDCCH signaling with an added bit is equal to the length which causes the PDCCH signaling on different CCE levels to pass through the C-RNTI check of the UE, one more bit needs to be added to prevent the PDCCH signaling on different CCE levels from passing through the C-RNTI check of the UE.

Figure 7:
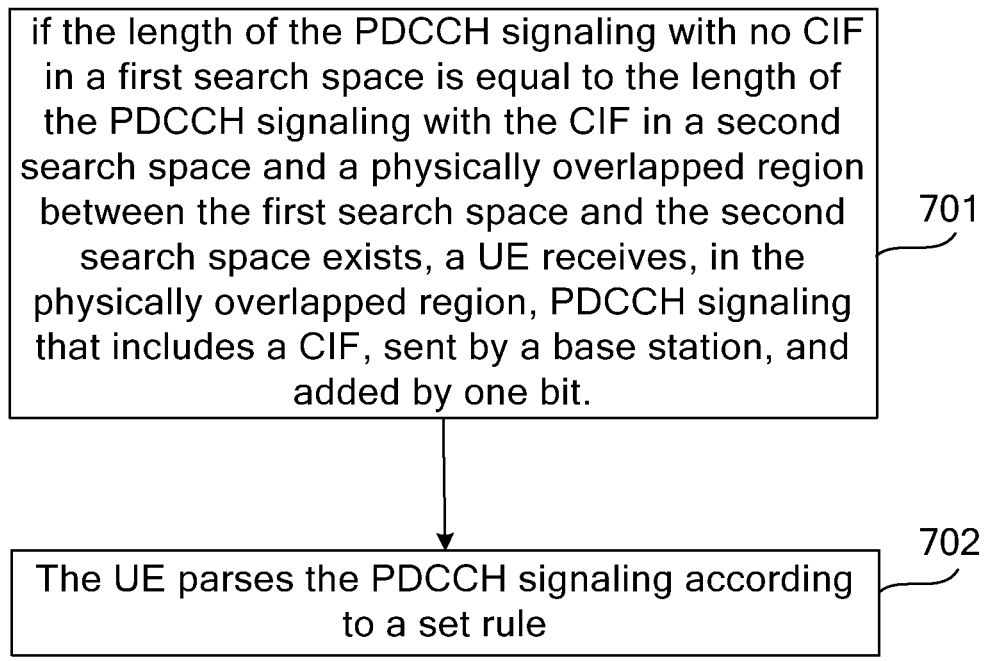
FIG. 7 is a flowchart of a method for receiving PDCCH signaling according to another embodiment of the present invention.

FIG. 7 is a flowchart of a method for receiving PDCCH signaling according to another embodiment of the present invention. The method includes the following steps.

Step 701: if the length of the PDCCH signaling with no CIF in a first search space is equal to the length of the PDCCH signaling with the CIF in a second search space and a physically overlapped region between the first search space and the second search space exists, a UE receives, in the physically overlapped region, PDCCH signaling that includes a CIF, sent by a base station, and added by one bit.

Step 702: The UE parses the PDCCH signaling according to a set rule.

If the PDCCH signaling sent by the base station includes an added bit and the CIF, the UE can parse the received signaling according to a rule of parsing PDCCH signaling with the CIF and the added bit. The specific rule of parsing is negotiated by the UE and the base station beforehand.

In an embodiment, the base station may determine the locations of a first search space and a second search space, and if the length of the PDCCH signaling with no CIF in the first search space is equal to the length of the PDCCH signaling with the CIF in the second search space, and a physically overlapped region between the first search space and the second search space exists, the base station may send only the PDCCH signaling with the CIF to the UE in the physically overlapped region after receiving RRC Connection Reconfiguration Complete signaling sent by the UE.

The first search space is a CSS, and the second search space is a UESS.

In an embodiment, if the length of the PDCCH signaling with no CIF in the first search space is equal to the length of the PDCCH signaling with the CIF in the second search space, and a physically overlapped region between the first search space and the second search space exists, where the PDCCH signaling with no CIF in the first search space is a first signaling and the PDCCH signaling with the CIF in the second search space is a second signaling, and in the physically overlapped region the first signaling may be distinguished from the second signaling by an existing bit, or a redundant bit, or a newly added bit or state whose absolute position is fixed in the PDCCH of the first signaling and the second signaling. "Absolute position is fixed" means that this field has a determined position in the PDCCH, for example, the last bit except the CRC bit.

For example, in a Frequency Division Duplex (FDD) system, the uplink carrier bandwidth is equal to the downlink carrier bandwidth, and the DCI formats are DCI format 0 and DCI format 1A. In DCI format 1A, the last bit except the CRC bit is a bit of a power command field; in DCI format 0, the last bit except the CRC bit is a padding bit which is 0 by default. It may be specified that the last bit being "0" means the PDCCH signaling is the first signaling, and that the last bit being "1" means the PDCCH signaling is the second signaling. If the last bit indicates a meaning, namely, if the last bit is not a redundant bit or a padding bit or state, the parsing of this field may be restricted, or another field in the PDCCH signaling can be used to express the meaning of this bit, for example, the meaning may be exchanged with the meaning of the power control field in the PDCCH signaling intended for scheduling downlink data.

In an embodiment, in a system that supports CA, uplink control signaling (including uplink ACK/NACK, and uplink channel state information) is all fed back on an uplink carrier specific to the UE. The uplink carrier is called an uplink primary carrier, the downlink carrier paired with the uplink carrier is called a downlink primary carrier, and other downlink carriers of the UE are called downlink non-primary carriers. One of the methods for power control for an uplink control channel is to perform control through a 2-bit power control command field in the PDCCH signaling intended for scheduling downlink data.

The data on uplink control channels corresponding to all downlink carriers of a UE is fed back on the uplink primary carrier only. Therefore, only the power control command field in the PDCCH signaling for scheduling the downlink primary carrier needs to be used for performing power control for uplink control channels, and the power control command field in the PDCCH signaling for scheduling downlink non-primary carriers is redundant for the power control. This redundant field may be used to represent the inherent meaning of the foregoing field which distinguishes the first signaling from the second signaling and has a fixed absolute position. The UE may use this field with a fixed absolute position to distinguish the first signaling from the second signaling, and parse this redundant field to obtain the meaning expressed by this field.

Figure 8:
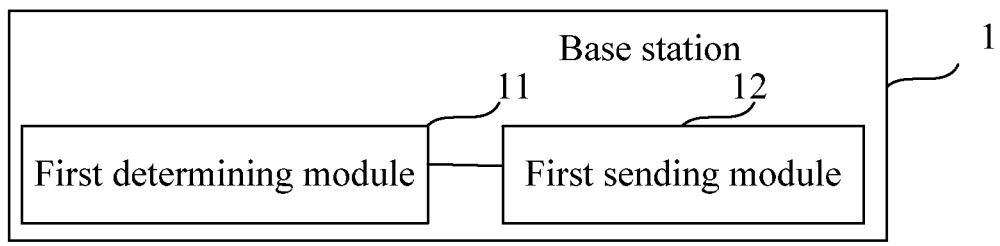
FIG. 8 is a schematic structural diagram of a base station according to an embodiment of the present invention.

FIG. 8 is a schematic structural diagram of a base station according to an embodiment of the present invention. The base station 1 includes a first determining module 11 and a first sending module 12. The first determining module 11 is configured to determine locations of a first search space and a second search space. The first sending module 12 is configured to send only PDCCH signaling with no CIF to the UE in a physically overlapped region between the first search space and the second search space if the physically overlapped region exists and the length of the PDCCH signaling with no CIF in the first search space is equal to the length of the PDCCH signaling with the CIF in the second search space; or send PDCCH signaling that includes the CIF and is added by one bit to the UE if the first PDCCH signaling is PDCCH signaling with no CIF in the first search space, and the second PDCCH signaling is PDCCH signaling with the CIF in the second search space; or send another type of PDCCH signaling except the first PDCCH signaling and the second PDCCH signaling to the UE within a time interval from the base station sending RRC signaling to the UE to the base station receiving RRC Connection Reconfiguration Complete signaling returned by the UE; and send only the PDCCH signaling with the CIF to the UE after the base station receives the RRC Connection Reconfiguration Complete signaling returned by the UE.

In an embodiment, a base station may include a third determining module that is configured to determine locations of a first search space and a second search space of a UE. The base station may also include a third sending module that is configured to send only PDCCH signaling with the CIF to the UE in a physically overlapped region between the first search space and the second search space after receiving RRC Connection Reconfiguration Complete signaling sent by the UE if the physically overlapped region exists and a length of the PDCCH signaling with no CIF in the first search space is equal to a length of the PDCCH signaling with the CIF in the second search space after the third determining module determines the locations of the first search space and the second search space of the UE.

The first search space is a CSS, and the second search space is a UESS.

Figure 9:
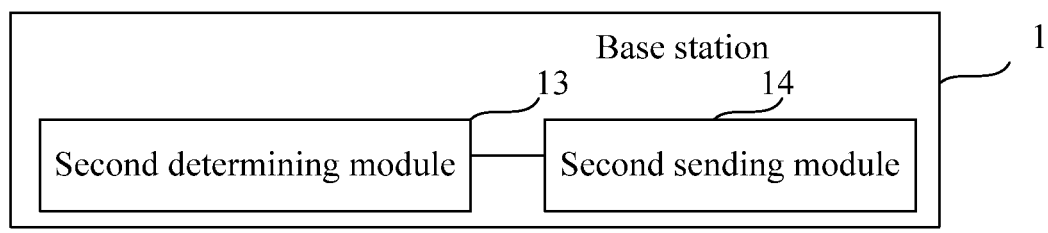
FIG. 9 is a schematic structural diagram of a base station according to another embodiment of the present invention.

FIG. 9 is a schematic structural diagram of a base station according to another embodiment of the present invention. The base station 1 includes: a second determining module 13 and a second sending module 14. The second determining module 13 is configured to determine locations of a first search space and a second search space. The second sending module 14 is configured to send third PDCCH signaling or fourth PDCCH signaling to the UE in a physically overlapped region within a time interval from sending RRC signaling to the UE to receiving RRC Connection Reconfiguration Complete signaling returned by the UE, where the third PDCCH signaling is PDCCH signaling with no CIF and the fourth PDCCH signaling is PDCCH signaling with the CIF after the second determining module determines the locations of the first search space and the second search space of the UE if a length of first PDCCH signaling in the first search space is equal to a length of second PDCCH signaling in the second search space where the first PDCCH signaling is PDCCH signaling with no CIF and the second PDCCH signaling is PDCCH signaling with the CIF, and the physically overlapped region exists between the first search space and the second search space, where a length of the third PDCCH signaling is unequal to a length of the fourth PDCCH signaling, and the length of the third PDCCH signaling is different from the length of the first PDCCH signaling and the length of the fourth PDCCH signaling is different from the length of the first PDCCH signaling.

In the embodiment shown in FIG. 9, the first search space and the second search space include two UESSs that are used to schedule different CCs of the UE.

Figure 10:
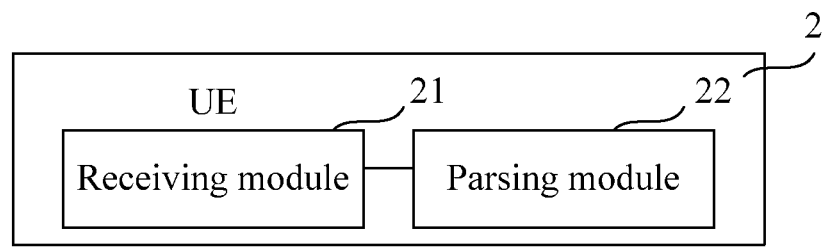
FIG. 10 is a schematic structural diagram of a UE according to an embodiment of the present invention.

FIG. 10 is a schematic structural diagram of a UE according to an embodiment of the present invention. The UE2 includes a receiving module 21 and a parsing module 22. The receiving module 21 is configured to receive PDCCH signaling with no CIF or receive PDCCH signaling sent by a base station that includes the CIF, added by one bit, in a physically overlapped region between a first search space and a second search space if the physically overlapped region exists and a length of the PDCCH signaling with no CIF in the first search space is equal to a length of the PDCCH signaling with the CIF in the second search space. The parsing module 22 is configured to parse the PDCCH signaling received by the receiving module 21 according to only a set rule of parsing PDCCH signaling with no CIF, or receive only the PDCCH signaling with the CIF sent by the base station after the UE parses RRC signaling correctly.

In an embodiment, the UE may further include a second receiving module that is configured to receive PDCCH signaling with the CIF in a physically overlapped region between the first search space and the second search space after the UE parses RRC signaling from a base station correctly if the physically overlapped region exists and a length of the PDCCH signaling with no CIF in the first search space of the UE is equal to a length of the PDCCH signaling with the CIF in the second search space of the UE. The UE may also include a second parsing module, configured to parse the PDCCH signaling with the CIF received by the receiving module according to only a set rule of parsing PDCCH signaling with the CIF.

A communication system is provided in an embodiment of the present invention. The communication system may include the base station shown in FIG. 8 and the UE shown in FIG. 10; the base station sends PDCCH signaling to the UE by using the method described in the method embodiment above, and the UE receives the PDCCH signaling from the base station by using the method described in the method embodiment above.

Another communication system is provided in an embodiment of the present invention. The communication system may include a base station and the UE shown in FIG. 9; the base station sends PDCCH signaling to the UE by using the method described in the method embodiment above, and the UE receives the PDCCH signaling from the base station according to the prior art.

With the base station and the UE provided herein, the base station is limited that the base station sends the PDCCH signaling with no CIF to the UE in the physically overlapped region between the first search space and the second search space if the physically overlapped region exists and a length of the PDCCH signaling with no CIF in the first search space is equal to a length of the PDCCH signaling with the CIF in the second search space.

Alternatively, the base station sends another type of PDCCH signaling except the first PDCCH signaling and the second PDCCH signaling to the UE within a time interval from sending RRC signaling to the UE to receiving RRC Connection Reconfiguration Complete signaling returned by the UE; and the base station sends PDCCH signaling with the CIF to the UE after receiving the RRC Connection Reconfiguration Complete signaling returned by the UE.

Alternatively, the base station sends another type of PDCCH signaling except the first PDCCH signaling and the second PDCCH signaling to the UE in the physically overlapped region between the first search space and the second search space within a time interval from sending semi-static RRC signaling to receiving RRC Connection Reconfiguration Complete signaling returned by the UE if the physically overlapped region exists and a length of the first PDCCH signaling with no CIF in the first search space is equal to a length of the second PDCCH signaling with the CIF in the second search space. In this way, the scheduling uncertainty of the base station is prevented, and the parsing error of the UE is prevented.

In an embodiment, the base station determines locations of a first search space and a second search space; and the base station sends the PDCCH signaling with the CIF to the UE in a physically overlapped region between the first search space and the second search space if the physically overlapped region exists and a length of the PDCCH signaling with no CIF in the first search space is equal to a length of the PDCCH signaling with the CIF in the second search space.

The UE receives the PDCCH signaling with the CIF sent by the base station in a physically overlapped region between the first search space and the second search space if the physically overlapped region exists and a length of the PDCCH signaling with no CIF in the first search space is equal to a length of the PDCCH signaling with the CIF in the second search space, and parses the PDCCH signaling according to a set rule.

If the PDCCH signaling sent by the base station includes the CIF, the UE can parse the PDCCH signaling according to a rule of parsing PDCCH signaling with the CIF after receiving the signaling. The specific rule of parsing is negotiated by the UE and the base station beforehand.

In the foregoing embodiment, the base station needs to send PDCCH signaling with the CIF to the UE if a physically overlapped region exists between the first search space and the second search space and a length of the PDCCH signaling with no CIF in the first search space is equal to a length of the PDCCH signaling with the CIF in the second search space. In this way, only the PDCCH signaling with the CIF is sent to the UE, and the UE is sure that the PDCCH signaling received in the physically overlapped region includes the CIF, and the resources allocated in the PDCCH signaling are surely resources that come from the carrier that is used to bear the PDCCH signaling, which prevents the UE from parsing the signaling incorrectly.

For example, in the period from the base station sending semi-static RRC signaling that is used to notify the UE of the current resource scheduling mode to the base station receiving RRC Connection Reconfiguration Complete signaling returned by the UE, and after the base station receives the RRC Connection Reconfiguration Complete signaling returned by the UE, if the length of PDCCH signaling with no CIF, in DCI format 0 or DCI format 1A, in the CSS of the current carrier in the UE that is used to bear PDCCH signaling, is equal to the length of PDCCH signaling with the CIF, in another format, in the UESS of the UE on the current carrier, where the PDCCH signaling with the CIF is used to schedule another carrier whose bandwidth is less than the bandwidth on the current carrier, and if a physically overlapped region between the CSS and the UESS exists, the base station sends PDCCH signaling with no CIF in the physically overlapped region, and the PDCCH signaling carries the resource allocation information specific to the UE. In an embodiment, the UE and the base station may negotiate beforehand that all PDCCH signaling sent in the physically overlapped region includes no CIF. Therefore, after receiving the PDCCH signaling, the UE is sure that the PDCCH signaling includes no CIF, and the resources allocated in the PDCCH signaling surely resources that come from the carrier that is used to bear the PDCCH signaling, which prevents the UE from parsing the signaling incorrectly.

The first search space may be a CSS, the second search space is a UESS, and the CCE level of the first search space and the second search space is 4 or 8. Alternatively, the first search space and the second search space include two UESSs that are used to schedule different CCs of the UE.

If the first search space is a CSS and the second search space is a UESS, the method shown in FIG. 2 is applicable, which does not increase the number of times PDCCH signaling is checked in the first search space. In addition, the scheduling freedom of the second search space is greater than that of the first search space (because the second search space can implement cross-carrier scheduling, but the first search space allows only same-carrier scheduling). Therefore, this solution reserves the scheduling freedom of the second search space completely, and does not impose any scheduling restriction on the second search space.

A base station provided in an embodiment of the present invention includes a fourth determining module that is configured to determine locations of a first search space and a second search space of a UE and a fourth sending module that is configured to send PDCCH signaling with the CIF or PDCCH signaling with no CIF to the UE in a physically overlapped region between the first search space and the second search space if the physically overlapped region exists and a length of the PDCCH signaling with no CIF in the first search space is equal to a length of the PDCCH signaling with the CIF in the second search space after the first determining module determines the locations of the first search space and the second search space of the UE.

A UE provided in an embodiment of the present invention includes a fourth receiving module that is configured to receive PDCCH signaling with the CIF or PDCCH signaling with no CIF sent by a base station in a physically overlapped region between a first search space and a second search space if the physically overlapped region exists and a length of the PDCCH signaling with no CIF in the first search space is equal to a length of the PDCCH signaling with the CIF in the second search space. The UE may also include a fourth parsing module, configured to parse the PDCCH signaling received by the receiving module according to a set rule.

Persons skilled in the art should understand that part of the steps of the method in the embodiments of the present invention may be implemented by a program instructing relevant hardware. The program may be stored in computer readable storage media. When the program runs, the program executes the steps of the method in the embodiments of the present invention. The storage media may be any media capable of storing program codes, such as a Read Only Memory (ROM), a Random Access Memory (RAM), a magnetic disk, or a Compact Disk-Read Only Memory (CD-ROM).

Finally, it should be noted that the above embodiments are merely provided for describing the technical solution of the present invention, but not intended to limit the present invention. It is apparent that persons skilled in the art can make various modifications, variations, and replacements to the invention without departing from the spirit and scope of the invention. The present invention is intended to cover the modifications, variations, and replacements provided that they fall within the scope of protection defined by the following claims or their equivalents.

What is claimed is:

1. A machine-readable storage medium having stored thereon, programming for execution by a machine, the programming including instructions to:
   determine locations of a first search space and a second search space, wherein the first search space and the second search space comprises a plurality of control channel elements (CCEs), and wherein the PDCCH signaling is made up of at least one CCE of the first search space or of the second search space;
   determine whether the first search space and the second search space overlap in at least one of the plurality of CCEs, and determine whether a length of the PDCCH signaling excluding a carrier indication field (CIF) in the first search space is equal to a length of the PDCCH signaling including the CIF in the second search space; and
   when the first search space and the second search space overlap in the at least one of the plurality of CCEs and when the length of the PDCCH signaling excluding the CIF in the first search space is equal to the length of the PDCCH signaling including the CIF in the second search space, transmit, in the at least one of the plurality of CCEs over which the first search space and overlaps the second search space, the PDCCH signaling excluding the CIF to the UE.

2. The machine-readable storage medium according to claim 1, wherein the first search space is a common search space (CSS), and the second search space is a UE-specific search space (UESS).

3. The machine-readable storage medium according to claim 2, wherein a CCE level of the PDCCH signaling in the CSS is 4 or 8, and wherein a CCE level of the PDCCH signaling in the UESS is 4 or 8.

4. The machine-readable storage medium according to claim 1, wherein the first search space comprises a first UE-specific search space (UESS) that is used to schedule a first component carrier (CC) of the UE, and wherein the second search space comprises a second UESS that is used to schedule a second CC of the UE.

5. The machine-readable storage medium according to claim 1, wherein the instructions to determine whether the first search space and the second search space overlap in the at least one of the plurality of CCEs includes instructions to:
   determine whether there is at least one CCE in the plurality of CCEs whose index in the first search space is the same as an index in the second search space, wherein the at least one CCE whose index in the first search space is the same as the index in the second search space comprises the at least one of the plurality of CCEs over which the first search space overlaps the second search space.

6. The machine-readable storage medium according to claim 1, wherein the programming further includes instructions to:
   cease transmitting the PDCCH signaling including the CIF in the at least one of the plurality of CCEs over which the first search space overlaps the second search space.

7. A machine-readable storage medium having stored thereon, programming for execution by a machine, the programming including instructions to:
   receive PDCCH signaling from a base station, wherein the PDCCH signaling is made up of at least one control channel element (CCE) of a first search space or a second search space, and wherein the first search space and the second search space comprise a plurality of CCEs; and
   when the first search space and the second search space overlap in at least one of the plurality of CCEs and when a length of the PDCCH signaling excluding a carrier indication field (CIF) in the first search space is equal to a length of PDCCH signaling including the CIF in the second search space, parse the received PDCCH signaling excluding the CIF that is positioned within the at least one of the plurality of CCEs over which the first search space overlaps the second search space.

8. The machine-readable storage medium according to claim 7, wherein the first search space is a common search space (CSS), and the second search space is a UE-specific search space (UESS).

9. The machine-readable storage medium according to claim 7, wherein the programming further includes instructions to:
   determine locations of the first search space and second search space; and
   determine whether the first search space and the second search space overlap in the at least one of the plurality of CCEs.

10. The machine-readable storage medium according to claim 9, wherein the instructions to determine whether the first search space and the second search space overlap in the at least one of the plurality of CCEs include instructions to:
   determine whether there is at least one CCE in the plurality of CCEs whose index in the first search space is the same as the index in the second search space, wherein the at least one CCE whose index in the first search space is the same as the index in the second search space is the at least one of the plurality of CCEs over which the first search space overlaps the second search space.

* * * * *